United States Patent Office 3,313,200
Patented Apr. 11, 1967

3,313,200
EXPANSIBLE FASTENER MEANS
Artur Fischer, Tumlingen, Germany
Filed Feb. 12, 1965, Ser. No. 432,111
Claims priority, application Germany, Feb. 17, 1964,
F 42,027
1 Claim. (Cl. 85—75)

The present invention relates to fastener means for connecting two elements, especially sheet metal members to each other. The fastener means of the present invention basically comprise an elongated sleeve member, and a substantially conical member in the sleeve member and cooperating therewith to cause during axial displacement of the conical member in one direction radial expansion of a portion of the sleeve member.

Such fastener means are known in the art and the conical member in the sleeve member is usually provided with a central threaded bore so that axial displacement of the conical member relative to the sleeve member and thereby radial expansion of the latter may be produced by threadingly connecting the threaded stem of a screw bolt with the conical member and by subsequently turning the screw. The sleeve member is driven at one end thereof through one bore of a sheet metal member, whereas the screw projects through a corresponding bore in another sheet metal member abutting against the first mentioned sheet metal member so that the two sheet metal members are, after a portion of the sleeve member is radially expanded, held together betwen the expanded portion of the sleeve member and the head of the screw.

Known fastener means of this type have, however, the disadvantage that the fastener means could not be released and properly refastened again since during release of the fastener means, the conical member used to turn with the screw, or the conical member after disengagement from the screw used to fall out from the sleeve member.

Furthermore, to assure relatively easy expansion of the sleeve member, the same had to be made according to the prior art with a relative small wall thickness, resulting in many cases to a tearing of the sleeve member during its radial expansion.

It is an object of the present invention to overcome these disadvantages of fastener means of this type known in the prior art.

It is a further object of the present invention to provide a fastener means of the aforementioned type adapted to be released and retightened again without any difficulty.

It is an additional object of the present invention to provide for a fastener means of the aforementioned type in which the sleeve member can be radially expanded with a relatively small force, while tearing of the sleeve member during its expansion will be positively prevented.

With these objects in view, the fastener means for connecting two elements, especially sheet metal members to each other, basically comprises an elongated sleeve member having a pair of opposite end portions and an intermediate portion between the end portions, and formed in the intermediate portion with a plurality of slots angularly spaced from each other and extending in the longitudinal direction of the sleeve member, and a conical member in the sleeve member and engaging the inner surface of the latter. The inner surface of the sleeve member is constructed so as to cause during axial displacement of the conical member toward one end portion radial outward bulging of the slotted intermediate portion. More specifically, the intermediate portion of the sleeve member has an inner frustoconical surface tapering toward one end portion and the conical member in the sleeve member is arranged spaced from the aforementioned one end portion of the sleeve member and engages the inner frustoconical surface of the intermediate portion so as to cause during axial displacement thereof towards the one end portion radial outward bulging of the slotted intermediate portion. By slotting the intermediate portion, it is possible to form the sleeve member with a relatively great wall thickness since the slots will assure a relatively easy and uniform radial expansion of the sleeve member during axial displacement of the conical member therein. The relative great wall thickness of the sleeve member will prevent any tearing of the same during axial displacement of the conical member, while at the same time the axial displacement of the conical member can be carried out with a relative small force.

According to the present invention the fastener means include also means on the sleeve member at the other end portions thereof for preventing movement of the frustoconical member out of the sleeve member through the other end portion. Such means may comprise one or a plurality of short tongues integrally connected with the other end portion of the sleeve member and projecting into the interior thereof transversely to the axis of the sleeve member, or an inwardly projecting annular portion, or the other end portion of the sleeve member may have a cylindrical portion of a diameter smaller than the maximum diameter of the frustoconical member and a tapering portion integrally connecting the aforementioned cylindrical portion to the intermediate portion of the sleeve member. Such a construction will reinforce also the other end portion of the sleeve member which will positively prevent formation of cracks at the other end portion of the sleeve member during radial expansion of the intermediate portion.

The conical member is provided with a central threaded bore adapted to be engaged with a corresponding thread of a screw or bolt so that axial displacement of the conical member relative to the sleeve member can be produced by turning the screw after the latter has been threadingly engaged with the threaded bore of the conical member.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Figure 1:
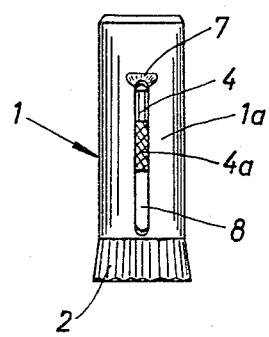
FIG. 1 is a front view of the fastener means according to the present invention in non-expanded condition.
Figure 2:
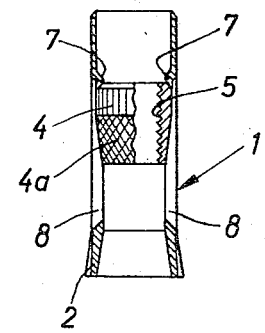
FIG. 2 is a longitudinal cross section through the fastener means shown in FIG. 1.

Referring now to the drawings and more specifically to FIGS. 1 and 2 of the same, it will be seen that the fastener means illustrated in FIGS. 1 and 2 include a substantially cylindrical sleeve member 1 having a pair of opposite end portions and an intermediate portion 1a provided with a plurality of longitudinally extending slots 8 angularly spaced from each other. One end portion 2 of the sleeve member 1 is preferably slightly conical with the maximum diameter at its free ends thereof, and the outer surface of this end portion 2 is preferably roughened, for instance by knurling. A frustoconical member is located in the interior of the sleeve member 1 and the frustoconical member has preferably a cylindrical portion 4 and a frustoconical portion 4a tapering toward the end portion 2. The outer surface of frustoconical portion 4a is preferably also roughened, for instance by knurling. The member 4, 4a is formed with a central bore therethrough provided with an inner screw thread 5. As clearly shown in FIG. 2 the inner surface of the intermediate portion 1a of the sleeve member conforms at least in part to the cone of the frustoconical portion 4a of the member therein, that is the inner surface of the intermediate portion 1a tapers toward the end portion 2. Means are provided on the end portion of the sleeve member opposite the end portion 2 preventing movement of the member 4, 4a out of the sleeve member through the other end portion. As shown in FIGS. 1 and 2, these means may comprise a plurality of short tongues 7 integral with the other end portion and extending aligned with the ends of the slots 8 adjacent the other end portion into the interior of the sleeve member transversely to the axis thereof.

Figure 3:
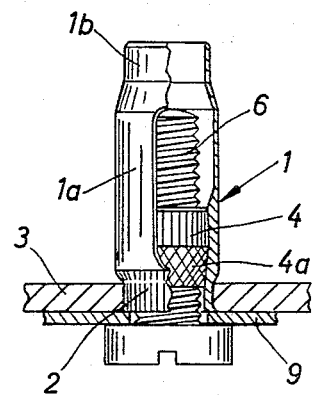
FIG. 3 is a partial sectioned front view of a further modification of a fastener means according to the present invention and showing the fastener means in expanded condition, connecting two sheet metal members to each other.

FIG. 3 illustrates a slightly modified form of the fastener means according to the present invention and the embodiment shown in FIG. 3 differs from that shown in FIGS. 1 and 2 by the means of preventing movement of the frustoconical member in the sleeve member out of the latter through the end portion opposite the end portion 2. In the embodiment as shown in FIG. 3 the sleeve member has opposite the end portion 2 a substantially cylindrical end portion 1b having an inner diameter slightly smaller than the diameter of the portion 4 of the member 4, 4a in the sleeve member and the cylindrical portion 1b, forming a reinforcing collar at the other end, is connected by a short frustoconical portion to the intermediate portion 1a of the sleeve member.

The fastener means according to the present invention is used as follows:

The sleeve member 1 with the member 4, 4a held therein is pushed through an opening or bore of sheet metal member 3 so that the slightly conical end portion 2 with its roughened outer surface is tightly engaged with the inner surface of the bore, while the remainder of the sleeve member 1 projects to one side of the sheet metal member 3. Another sheet metal member 9 is then placed against the other side of the sheet metal member 3 so that a corresponding bore in the sheet metal member 9 is aligned with the bore in the sheet metal member 3. A screw is then extended through the aligned bores and the stem 6 of the screw is threadingly engaged with the thread 5 provided in the axial bore of the member 4 and 4a. Turning of the screw in the appropriate direction by means of a screw driver inserted in the slot in the screw head will then cause axial displacement of the member 4, 4a in the sleeve member 1 toward the end portion 2 to cause thereby radial expansion of the slotted intermediate portion of the latter so that the sheet metal members 3 and 9 will be held together between the expanded intermediate portion 1a of the sleeve member and the head of the screw as shown in FIG. 3.

It will be understood that each of the elements described above, or two or more together, may also find a useful application in other types of fastener means differing from the types described above.

While the invention has been illustrated and described as embodied in a fastener means having a sleeve member wtih a slotted intermediate portion and a conical member axially displaceable relative to the sleeve member and cooperating therewith to cause during axial displacment radial expansion of the slotted intermediate portion of the sleeve member, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

Fastener means for connecting two elements, especially sheet metal members, to each other comprising, in combination, an elongated one-piece sleeve member having a pair of opposite circumferentially complete annular end portions and an intermediate slotted portion between said circumferentially complete annular end portions and being formed in said intermediate portion with a plurality of slots angularly spaced from each other and extending in the longitudinal direction of said sleeve member, said intermediate portion having an inner frustoconical surface tapering toward one of said circumferentially complete annular end portions; a frustoconical member in said intermediate slotted portion of said sleeve member, having a length smaller than the length of said intermediate slotted portion spaced from said one circumferentially complete annular end portion and engaging with a conical surface thereof said inner surface of said intermediate portion, said frustoconical member being formed with a central bore therethrough provided with an inner screw thread, whereby when said one circumferentially complete annular end portion of said sleeve member is driven in a bore of a sheet metal member with the remainder of said sleeve member projecting to one side of said sheet metal member, a screw may be extended through an aligned bore in another sheet metal member abutting against the other side of the first mentioned sheet metal member and be threadingly engaged with said threaded bore of the frustoconical member so that subsequent turning of the screw will cause movement of said frustoconical member toward said one circumferentially complete annular end portion of said sleeve member and thereby radial expansion of the slotted intermediate portion only without any deformation of said opposite circumferencially complete annular end portions so that the two sheet metal members will be held together between the expanded intermediate portion of said sleeve member and the head of said screw; and means at the other circumferentially complete annular end portion of said sleeve member preventing movement of said frustoconical member through said other end portion, said means comprising a plurality of short tongues integral with said other circumferentially complete annular end portion, respectively aligned with said slots and extending from the ends of said slots adjacent to said other circumferentially complete annular end portion toward the axis of said sleeve member.

References Cited by the Examiner

UNITED STATES PATENTS

| | | | |
|---|---|---|---|
| 1,109,955 | 9/1914 | Barrett | 85—76 |
| 1,407,782 | 2/1922 | Church et al. | 85—75 |
| 1,650,957 | 11/1927 | Ogden et al. | 85—75 |
| 2,381,113 | 8/1945 | Cook | 85—75 |
| 2,653,334 | 9/1953 | Bay | 85—71 |
| 3,196,733 | 7/1965 | Cohen et al. | 85—75 |

CARL W. TOMLIN, *Primary Examiner.*

R. S. BRITTS, G. A. MILWICK, *Assistant Examiners.*